United States Patent [19]

Petrizzelli

[11] Patent Number: 4,904,493
[45] Date of Patent: Feb. 27, 1990

[54] SHELF-STABLE PATISSERIE DOUGH

[75] Inventor: Gaetano Petrizzelli, Gif sur Yvette, France

[73] Assignee: CPC International Inc., Englewood Cliffs, N.J.

[21] Appl. No.: 80,732

[22] Filed: Aug. 3, 1987

[30] Foreign Application Priority Data

Aug. 11, 1986 [FR] France ................ 86 11588

[51] Int. Cl.$^4$ .................. A21D 6/00; A21D 13/08
[52] U.S. Cl. .................. 426/549; 426/556; 426/622
[58] Field of Search .......... 426/549, 556, 622

[56] References Cited

U.S. PATENT DOCUMENTS

| | | | |
|---|---|---|---|
| 3,294,547 | 12/1966 | Kooistra | 426/556 |
| 3,492,127 | 1/1970 | Ketch et al. | 426/556 |
| 3,869,558 | 3/1975 | Hampton et al. | 426/622 |
| 4,372,982 | 2/1983 | Haasl et al. | 426/556 |
| 4,414,228 | 11/1983 | Nourigeon | 426/19 |

OTHER PUBLICATIONS

Tresler and Sutcan, Food Products Formulary, vol. 2, Westport, Conn. AVI Publishing Co. Inc., 1975, pp. 144–148.

Primary Examiner—Donald E. Czaja
Assistant Examiner—Mary S. Mims

[57] ABSTRACT

A shelf-stable dough product, which is useful for pastry products, having a shelf life of at least 12 months at ambient temperatures. The shelf-stable dough product is an intermediate moisture dough in which the water activity value is fixed in an optimum range of between 0.60–0.80. The dough product contains inactivated flour, re-dried native starch, fat, sugar, water, glycerol, or alternatively, sorbitol, salt flavoring agents, and, optionally, a fat emulsifying agent. The inactivated flour useful according to the invention has a zero alpha-amylasic activity, very reduced lipasic and peroxidasic activity, and a water content from about 3–6%. After baking, the dough product of the invention resembles a home-made pastry product.

9 Claims, 3 Drawing Sheets

SHELF-STABLE PATISSERIE DOUGH

FIELD OF THE INVENTION

The invention relates to a shelf-stable ready to use dough product which is suitable for pastry products such as pie shells or biscuits, and a process for its preparation. The dough product is an intermediate moisture dough in which the water activity value is fixed in an optimum range of between 0.60–0.80. It contains inactivated flour which increases the shelf life and improves the quality of the dough. The dough has a shelf life of at least twelve months at ambient temperatures without the need to incorporate any preservatives, bactericides or fungicides therein. After baking, the dough product of the invention resembles a home-made pastry product.

BACKGROUND OF THE INVENTION

Many known ready to use dough products require the use of a cold chain, from the production of the dough to distribution and storage at the consumer level. These dough products have drawbacks since breaks sometimes occur in the cold chain. An additional drawback is that the product must be brought slowly to an optimum temperature prior to consumer use, thereby requiring an additional processing step.

Some ready to use dough products, which require a cold chain, incorporate a sterilization step in the processing of the dough. However, the organoleptic quality of sterilized foods is, in some cases, unsatisfactory. In fact, some products do not withstand sterilization at all.

Alternately, preservatives may be incorporated into ready to use dough products. The amount of preservatives that can be used is extremely limited, however, due to regulatory constraints. Thus, the shelf life of dough products is not increased appreciably by the use of preservatives.

U.S. Pat. No. 3,769,034 is an example of a shelf-stable dough which incorporates a preservative in its composition. The dough composition claimed therein has a moisture level of 18–26% and contains an amylaceous component, a portion of which is gelatinized and a portion which is ungelatinized. It also contains shortening, a dough plasticizer, a mold and yeast inhibitor in small amounts, and a chelating agent to prevent browning at warm storage temperatures. Due to regulatory limitations, only small amounts of yeast and mold inhibitors can be used. Thus, the shelf life of this dough is not increased significantly by the use of preservatives.

Intermediate moisture foods are also known to have shelf-stability. The water activity of intermediate moisture food products is fixed at a mean value of about 0.6 to 0.9 to inhibit microorganism growth. There are, however, disadvantages to an intermediate moisture pastry dough product, which, of course, is flour-based. While the water activity of the pastry dough can be stabilized by using chemical depressors to form an intermediate moisture product, the dough lacks the desirable qualities of pastry dough relating to plasticity, texture, appearance and taste after baking.

The present invention is an attempt to overcome the limitations of known shelf-stable ready to use pastry doughs by providing a process for preparation of an intermediate moisture dough product which can be kept at ambient temperatures for at least twelve months without deteriorating in quality and which, when baked, closely resembles, with respect to texture, appearance and taste, a pastry product prepared from home-made dough.

A further improvement in the art that is taught herein is an inactivation method for the flour used in the dough product. The flour inactivation method facilitates preparation of a pastry product having the desirable culinary properties of pastry prepared from a home-made dough, as well as having increased storage-stability.

SUMMARY OF THE INVENTION

It is an object of the invention to provide an intermediate moisture dough product, and process therefor, which is shelf-stable and which overcomes the disadvantages of the prior art. The product has a shelf life of at least twelve months at ambient temperatures. The flour used in the invention is inactivated prior to incorporation into the pastry dough, resulting in increased shelf-stability of the pastry dough product and other desirable pastry qualities. After baking, the dough forms a baked product resembling home-made pastry in taste, texture and appearance.

DETAILED DESCRIPTION OF THE INVENTION

The shelf-stable, intermediate moisture pastry dough product of the invention has a fixed water activity level in an optimum range of 0.60–0.80. The dough product of the invention contains, in percentage by weight with respect to the final product, 30–40% inactivated cereal flour, 13–20% re-dried native starch, 15–25% fats, 15–25% sugar, having a grain size less than 250 microns, 5–10% water, 2–5% glycerol, or alternatively, 4–7% sorbitol. Sufficient amounts of salt and flavoring agents, and up to about 1% by weight of the final product, of a fat emulsifying agent may also be incorporated into the product.

An important feature of the instant invention is the use of inactivated flour which results in increased shelf-stability and a high quality product resembling home-made pastry dough. The inactivated flour has a zero alpha-amylasic activity, very reduced lipasic and peroxidasic activities, and a water content of 3–6%.

According to the invention, the cereal grains which comprise the cereal flour are inactivated by heat treatment in the following manner: steam treatment of the grains; cooling after pre-drying; crushing, then sifting the flour, and drying the flour in hot air to obtain a water content of 3–6%.

The optimum values to be used with respect to the amount of time and the temperature for steam treatment of the cereal grains of the invention are determined from the inactivation rates of the enzymes. These values are shown in the graphs set forth in FIGS. 1–3.

Referring to the figures, time is plotted in minutes as the abscissa and the residual activity for various heat treatment temperatures is plotted as the ordinate.

Figure 1:
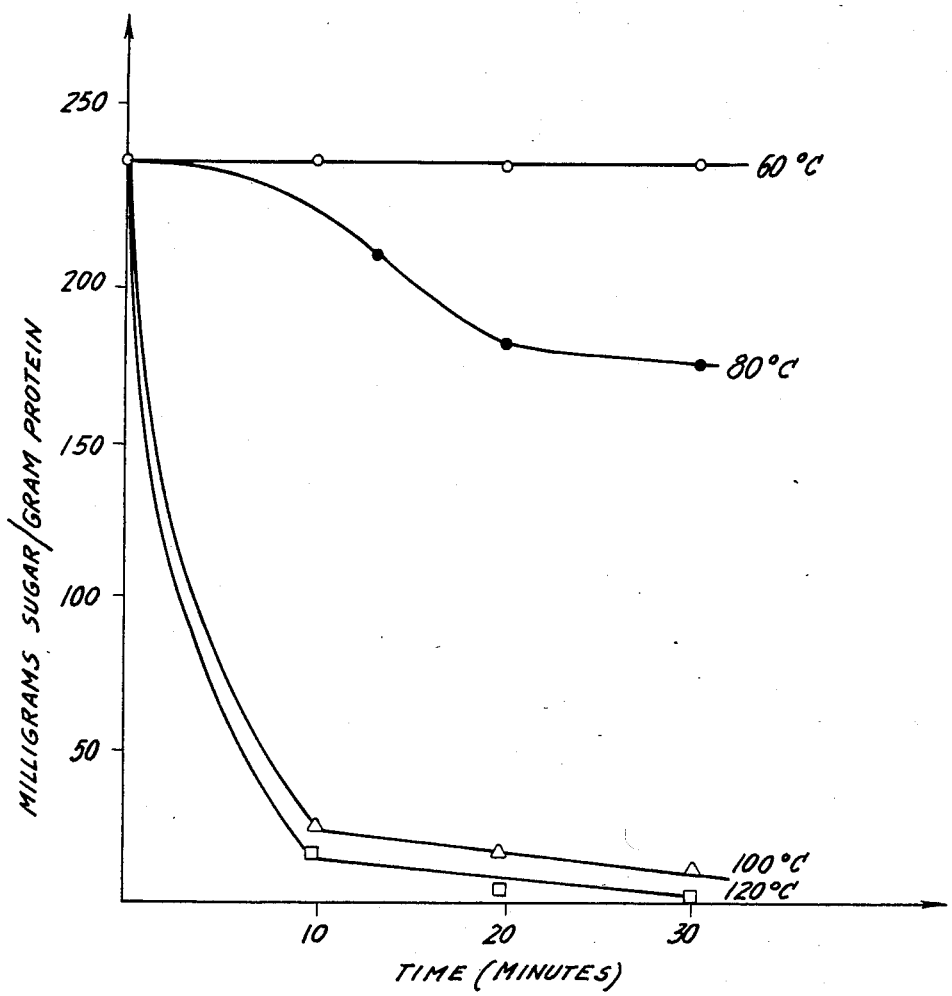

More specifically, FIG. 1 charts the residual alpha-amylase like activity.

Figure 2:
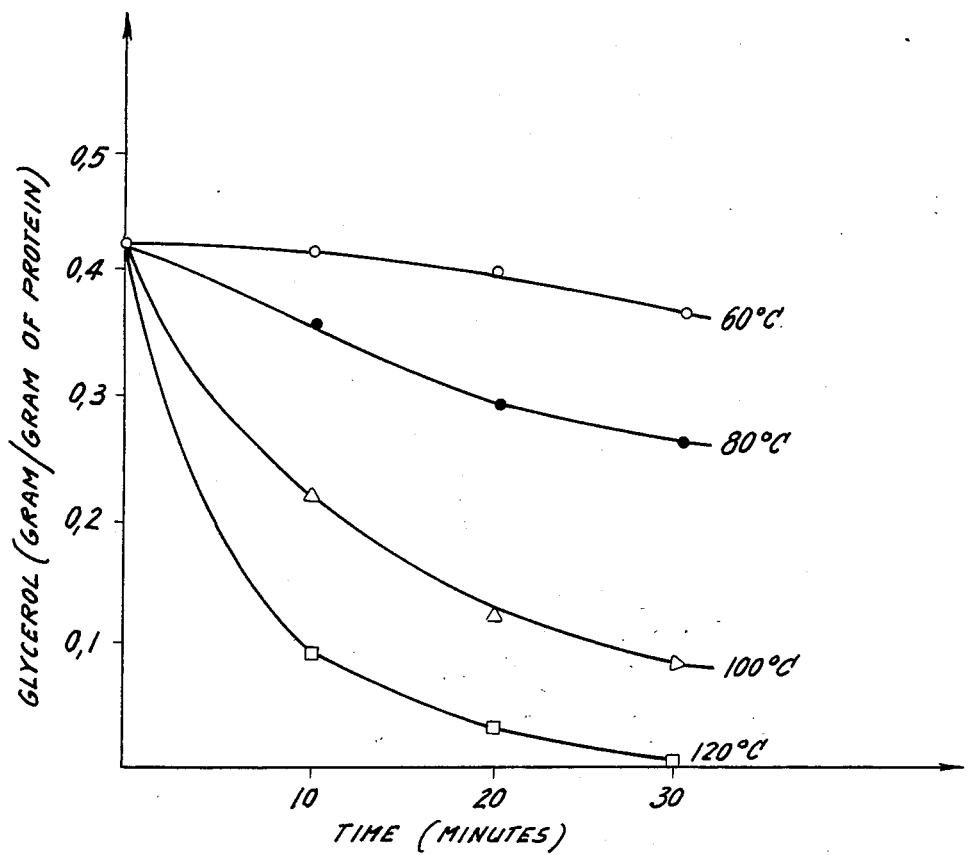

FIG. 2 charts the residual lipase like activity.

Figure 3:
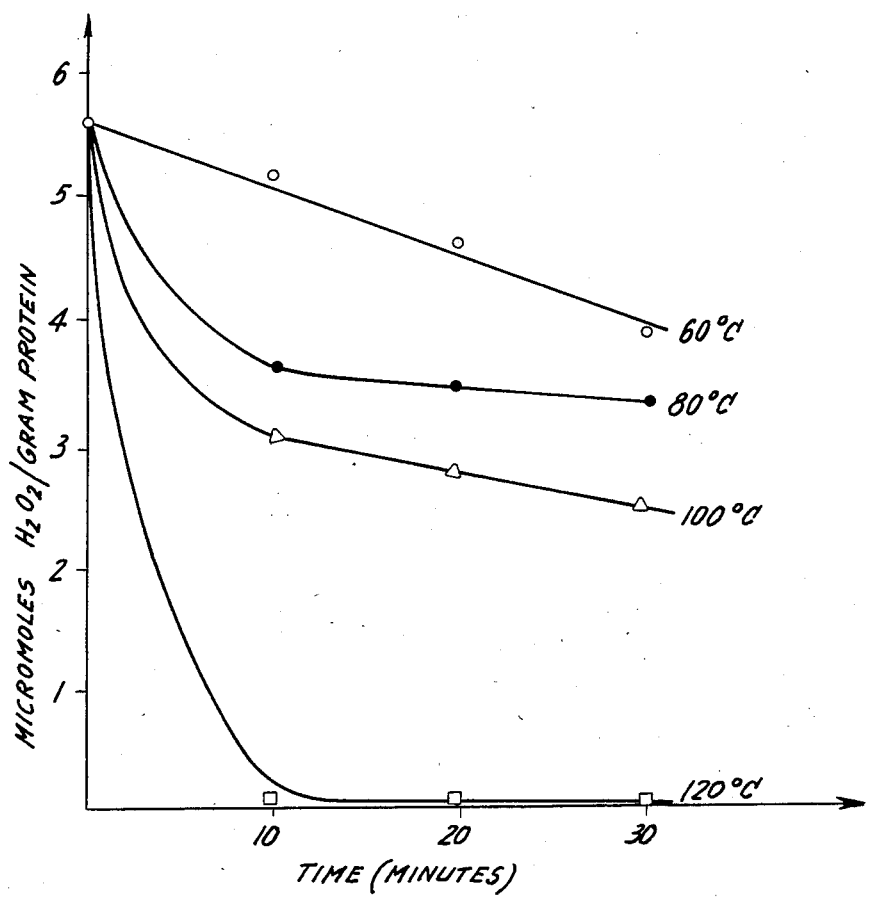

FIG. 3 charts the residual peroxidase like activity.

The activity of the various enzymes was measured during heat treatment. The amylase like activity was charted by quantitative analysis of the reducing sugars using the Nelson-Somogy method. The lipase like activity was charted by quantitative analysis of glycerol. The peroxidase like activity was charted by the phenylenediamine method of B. Fretzdorff following the variation of extinction at 440 nanometers, or the change in light absorption at 440 nanometers measured by reaction with phenylenediamine as the reagent. The figures indicate that the cereal grains must be heated to a temperature of 100°–120° C. for 20–30 minutes to obtain the desired enzymatic inactivation. In particular, the lipasic activity is reduced by more than 90%, which results in an exceptionally shelf-stable finished product at ambient temperatures while avoiding the enzymatic degradation of lipids.

The starch useful for the pastry dough product of the invention is, preferably, a maize starch, which lowers the water activity of the product. Sugar is useful, according to the invention, as a natural preservative, as well as for its organoleptic properties. Sugar adds to the crispiness of the product after baking.

The fats useful according to the instant invention must be able to withstand chemical as well as enzymatic oxidation. A highly hydrogenated peanut fat, for example, can be used effectively in the product. Fats used in the product confer plasticity on the dough. The fats may be combined with emulsifiers such as lecithin (E 322) or a mixture of fatty acid mono- or diglycerides (E 471) and lecithin. Fat emulsifiers may be used in amounts up to about 1% and preferably from about 0.5–0.6% by weight of the dough.

Glycerol is present in a relatively small amount of 2–5% by weight of the dough. Glycerol acts as a chemical depressor to lower the water activity. Glycerol also causes reverse osmotic action which inhibits the metabolic activity of microorganisms. Moreover, glycerol confers plasticity on the dough, acting as a lubricant between the particles. As stated hereinabove, sorbitol can be substituted for glycerol in amounts of 4–7% by weight of the dough. Sorbitol also lowers the water activity, and acts as a plasticizing agent.

The dough product of the invention, which is useful for pastry products, may be flavored by the addition of cocoa, cinnamon, vanilla or lemon, among other spices and flavoring agents.

The process for preparing the dough product of the invention entails a precise sequence of steps which incorporates the dough ingredients while continuously mixing. The process is conducted in the following manner: the fats, to which an emulsifier may be added, as needed, is mixed until a pomade is formed. The following ingredients are then added to the pomade, in this order, while mixing: inactivated flour, sugar, starch and salt. Mixing continues until a homogeneous product is formed. Water is added, with crushed ice, (if required, to lower temperature), followed by glycerol or sorbitol. The mixture is then kneaded at high speed for about 30 seconds to form the dough.

The dough is then rolled out, cut into slabs and packed under high vacuum. The packing material must form a humidity and oxygen tight barrier. The dough, which is ready for use, may be kept at ambient temperatures for 12 months or more. It may then be rolled, prepared, molded, decorated or stuffed and baked in the oven. It may also be cut up and baked in the oven for the preparation of biscuits.

The present invention is more particularly described in the claims appended hereto.

I claim:

1. A storage-stable, intermediate moisture dough product, which is particularly useful for pastry products, having a water activity fixed in an optimum range from about 0.60–0.80 and which comprises, in percentage by weight with respect to the final product, 30–40% inactivated cereal flour, 13–20% re-dried native starch, 15–25% fats, 15–25% sugar, 5–10% water, 2–5% glycerol, or alternately 4–7% sorbitol, salt and flavoring agents, wherein the inactivated cereal flour has a zero alpha-amylasic activity, a lipasic activity reduced by more than 90%, a reduced peroxidasic activity and a water content of from about 3 to 6%.

2. The storage-stable dough product of claim 1 wherein said inactivated cereal flour is obtained by heat treatment of the cereal grains at about 100°–120° C. for about 20–30 minutes, followed by cooling after pre-drying, crushing, and sifting the flour, then drying the flour in hot air, to obtain a water content of about 3–6%.

3. The storage-stable dough product of claim 1 wherein said re-dried native starch is comprised of maize starch.

4. The storage-stable dough product of claim 1 wherein said fats are comprised of a highly hydrogenated peanut fat.

5. The storage-stable dough product of claim 1 which combines up to about 1% by weight of the dough product, of a fat emulsifying agent with said fats.

6. The storage-stable dough product of claim 1 wherein said fat emulsifying agent is selected from the group consisting of lecithin, or a mixture of fatty acid mono- or diglycerides and lecithin.

7. The storage-stable dough product of claim 1 wherein said sugar has a grain size up to about 250 microns.

8. The storage-stable dough product of claim 1 wherein said flavoring agents are comprised of spices and flavorings.

9. The storage-stable dough product of claim 8 wherein said flavoring agents are selected from the group consisting of cocoa, cinnamon, vanilla, or lemon.

* * * * *